United States Patent [19]
Masuda et al.

[11] Patent Number: 6,139,713
[45] Date of Patent: Oct. 31, 2000

[54] METHOD OF MANUFACTURING POROUS ANODIZED ALUMINA FILM

[75] Inventors: Hideki Masuda; Masashi Nakao; Toshiaki Tamamura, all of Tokyo, Japan

[73] Assignee: Nippon Telegraph and Telephone Corporation, Tokyo, Japan

[21] Appl. No.: 09/180,240

[22] PCT Filed: Aug. 26, 1997

[86] PCT No.: PCT/JP97/02965

§ 371 Date: Nov. 2, 1998

§ 102(e) Date: Nov. 2, 1998

[87] PCT Pub. No.: WO98/09005

PCT Pub. Date: Mar. 5, 1998

[30] Foreign Application Priority Data

Aug. 26, 1996 [JP] Japan .................................... 8-223526

[51] Int. Cl.$^7$ ................................................ C25D 11/16
[52] U.S. Cl. .................... 205/206; 205/213; 205/223; 205/229; 205/324; 205/328; 205/332
[58] Field of Search .................................. 205/206, 213, 205/223, 229, 324, 328, 332

[56] References Cited

U.S. PATENT DOCUMENTS 4,889,631   12/1989   Rigby et al. ........................ 210/493.1

FOREIGN PATENT DOCUMENTS 60-177198   9/1985   Japan .
61-101946   5/1986   Japan .
62-270794   11/1987  Japan .
8-78769     3/1996   Japan .

OTHER PUBLICATIONS

"Structure and Density of Anodic Oxide Films Formed on Aluminum in Oxalic Acid Solutions" by Ken Ebihara et al., Kinzokuhyomengijutsu, vol. 34, No. 11, 1983, pp. 28–33.

"Fabrication of Gold Nanodot Array Using Anodic Porous Alumina as an Evaporation Mask" by Hideki Masuda et al., Jpn.J. Appl.Phys. vol. 35 (1996) pp. L126–L129, Part 2, No. 1B, Jan. 15, 1996.

"Ordered Metal Nanohole Arrays Made by a Two–Step Replication of Honeycomb Structures of Anodic Alumina" by Hideki Masuda et al., Science vol. 268, Jun. 9, 1995, pp. 1466–1468.

*Primary Examiner*—Donald R. Valentine
*Assistant Examiner*—William T.. Leader
*Attorney, Agent, or Firm*—Blakely Sokoloff Taylor & Zafman

[57] ABSTRACT

A plurality of recesses having the same interval and array as those of pores of an alumina film, which are to be formed in anodizing, are formed on a smooth surface of an aluminum plate in advance, and then, the aluminum plate is anodized. With this process, the roundness of the pores of the porous anodized alumina film and the uniformity of pore size are improved, and the pores are regularly arrayed at a predetermined interval. The recesses are formed by pressing a substrate having a plurality of projections on its surface against the aluminum plate surface to be anodized.

12 Claims, 8 Drawing Sheets

METHOD OF MANUFACTURING POROUS ANODIZED ALUMINA FILM

TECHNICAL FIELD

The present invention relates to a method of forming a porous anodized alumina film in which pores having a predetermined shape are arrayed at a predetermined interval.

BACKGROUND ART

Conventionally, as a porous material having a uniform pore size, a porous anodized alumina film is known. The porous anodized alumina film is a porous alumina film formed on an aluminum surface by anodizing aluminum in an acid electrolyte. As a characteristic feature, pores are self-aligned perpendicularly to the film surface, and the uniformity of the pore size is relatively satisfactory. For this reason, the porous anodized alumina film is expected to be used not only as a functional material represented by a filter but also as a starting structure for the form of various nanodevices.

The industrial applicability of such a porous material is considerably influenced by the regularity of the porous structure (pore shape and array). At this point a porous anodized alumina film formed by the conventional technique does not have a satisfactory regularity. More specifically, the porous anodized alumina film formed by the conventional technique has no independent pores perpendicular to the film surface. In addition, the interval between adjacent pores is not constant, and the pores are not round. As a result, the pore sizes are distributed in a wide range.

Straight and independent pores perpendicular to the film surface are not obtained due to the following formation mechanism of the porous structure of the porous anodized alumina film. At the start of anodizing, pores are formed at random, and some of them preferentially grow to form the porous structure. For this reason, at the early stage of anodizing, the porous structure has no regularity, and the pores are bent.

DISCLOSURE OF INVENTION

[Problem to be Solved by the Invention]

Conventionally, as a method of solving this problem, the two-step anodizing method has been proposed (Jpn. Journal of Applied Phisics, Vol. 35, Part 2, No. 1B, pp. L126–L129, Jan. 15, 1996). An oxide film formed by performing anodizing for a predetermined time is temporarily selectively dissolved and removed, and then, anodizing is performed again under the same condition, thereby forming an oxide film having straight and independent pores perpendicular to the film surface. This method utilizes the fact that recesses (concaves) are formed in the aluminum surface by removing the anodized film formed by the first anodizing process, and these recesses serve as starting points of the second anodizing process.

With this method, the perpendicularity, straightness, and independence o f each pore are improved, though the pore array has a predetermined disturbance. For this reason, the pore interval is not constant, and the roundness of each pore is not sufficient.

It is an object of the present invention to provide a method of forming a porous anodized alumina film, which solves the problems in the porous anodized film formed by the above-described conventional method, i.e., t h e low regularity of the pore array and the unsatisfactory roundness and size distribution of pores, thereby regularly arraying the pores at a predetermined interval and improving the pore roundness and pore size uniformity.

[Means of Solution to the Problem]

The present invention has been made to achieve the above object, and according to the first aspect of the present invention, there is provided a method of forming a porous anodized alumina film comprising forming in advance, on a smooth surface of an aluminum plate to be anodized, a plurality of recesses (recessed portions) having the same interval and array as those of pores of an alumina film to be formed in anodizing, and then anodizing the aluminum plate, thereby forming a porous anodized alumina film in which pores having a predetermined shape are regularly arrayed to have the same interval and array as those of the plurality of recesses.

In the present invention, the recesses are artificially formed in advance in the aluminum plate surface to be anodized at the same interval as that of the pores to be formed in anodizing. With this arrangement, the recesses serve as the starting points of anodizing. The pores are formed at positions corresponding to the recesses, so a porous anodized alumina film is formed in which pores not bent are arrayed at an equal interval in accordance with the array of the recesses. To form pores having more satisfactory straightness, perpendicularity, and independence in an array with high regularity, the surface of the aluminum plate to be anodized preferably has a high smoothness. As a result, a porous anodized alumina film with pores having not only high perpendicularity, straightness, and independence but also a high aspect ratio in the direction of film thickness and a structure in which pores around each pore are regularly arrayed in the form of a regular hexagon at a predetermined interval can be obtained.

In the present invention, the aluminum plate includes all aluminum members having a smooth surface to be anodized, i.e., not only a single aluminum body but also an aluminum film formed on a substrate consisting of another material such as silicon.

In the present invention, to form and array the plurality of recesses in the surface of the aluminum plate to have the predetermined interval, a resist pattern may be formed on the aluminum plate surface by, e.g., photolithography or electron beam lithography, and then, the aluminum plate may be etched. However, especially, when a porous anodized alumina film having pores at a very small interval of about 0.1 $\mu$m is to be formed, a high-resolution micropatterning technique using electron beam lithography or X-ray lithography must be used to artificially and regularly form the fine recesses in the aluminum plate surface. It is not economical to apply such micropatterning technique every time a porous anodized alumina film is formed.

According to the second aspect of the present invention, there is provided a method of forming a porous anodized alumina film, comprising pressing a substrate having a plurality of projections (convexes) corresponding to recesses against an aluminum plate surface to be anodized to form, on the aluminum plate surface, recesses having the same interval and array as those of pores of an alumina film to be formed in anodizing, and then, anodizing the aluminum plate, thereby forming a porous anodized alumina film having porous regularly arrayed at a predetermined interval.

In the present invention, the method of pressing the substrate with the projections against the aluminum plate can be practiced by bringing the substrate with the projections in tight contact with the aluminum plate and applying a pressure using a hydraulic press or the like.

The projection array (pattern) formed on the substrate corresponds to the array of pores of the porous anodized alumina film to be formed by anodizing. Not only a periodical array having the shape of a regular hexagon but also an arbitrary pattern with partial omission in a periodical pattern can be used.

The substrate having the projections preferably has not only a mirror surface but also a strength and hardness enough not to destroy the projections or change the projection arrangement due to the pressure. For this purpose, a substrate such as a general-purpose silicon substrate easy to micropattern as well as a metal substrate of aluminum or tantalum can be used. A substrate consisting of diamond or silicon carbide having a high strength is more preferable because the substrate can be repeatedly used.

When one substrate having projections is formed, it can be repeatedly used, and a regular recess array can be efficiently formed on a number of aluminum plates, so a porous anodized alumina film can be formed at low cost.

The interval of pores formed by anodizing is proportional to the voltage in anodizing, and it is known that the proportional constant is about 2.5 nm/V. The pores of the porous anodized alumina film which are self-aligned by anodizing tend to finally form a hexagonal close-packed array. The pore interval at this time depends on the anodizing voltage. Therefore, when the recesses are formed at the same interval as the pore interval, a satisfactory regularity can be obtained.

According to the third aspect of the present invention, there is provided a method of forming a porous anodized alumina film, characterized by comprising forming a plurality of recesses on an aluminum plate surface such that recesses around each recess are arrayed in a regular hexagon, and performing anodizing at an anode oxidation voltage obtained by dividing the interval of the recesses by 2.5 nm/V.

As the electrolyte used for anodizing, a solution functioning as a solvent for an aluminum oxide can be used, and an acid electrolyte such as sulfuric acid, a mixed bath of oxalic acid and sulfuric acid, or phosphoric acid can be used in addition to oxalic acid.

According to the fourth aspect of the present invention, there is provided a method characterized by comprising, when the oxalic acid bath is used for anodizing, performing anodizing at an anode oxidation voltage within the range of 35 to 45 V.

According to the fifth aspect of the present invention, there is provided a method characterized by comprising, when the sulfuric acid bath is used, performing anodizing at an anode oxidation voltage within the range of 23 to 28 V.

With this arrangement, a porous anodized alumina film with pores having satisfactory roundness and arrayed in a satisfactory hexagonal close-packed array with an improved pore size can be obtained. Therefore, the functions of porous materials represented by various filters can be improved, and the applicability of these materials can be enhanced.

When a mixed bath of oxalic acid and sulfuric acid is used, a satisfactory result can be obtained at an intermediate voltage.

According to the sixth aspect of the present invention, there is provided a method of forming a porous anodized alumina film, characterized by comprising forming the porous anodized alumina film having the pores having the predetermined shape and the same interval and array as those of the plurality of recesses by anodizing, removing the aluminum plate from the porous anodized alumina film, and removing a barrier layer (layer without pores) of the porous anodized alumina film.

With this process, an alumina film having through holes can be obtained as a porous material represented by various filters.

[Effect]

According to the present invention, the following effects can be obtained from the arrangements described in the claims.

(1) A plurality of recesses (recessed portions) having the same interval and array as those of pores of an alumina film to be formed in anodizing are artificially formed on the surface of an aluminum plate in advance, and then, anodizing is performed. With this arrangement, a porous anodized alumina film in which the pores are regularly arrayed at a predetermined interval, and the roundness of pores and uniformity of pore size are improved can be formed.

(2) When the recess pattern to be formed on the aluminum plate surface is changed, the pore arrangement of the porous anodized alumina film can be controlled.

(3) By pressing a substrate having a plurality of projections on its surface against the aluminum plate surface to be anodized, recesses having the same interval and array as those of pores of the alumina film to be formed in anodizing are formed on the aluminum plate surface. For this reason, a fine recess array can be efficiently formed on a number of aluminum plates using one substrate (mother pattern), and accordingly, a porous anodized alumina film can be formed at low cost.

(4) By appropriately setting the anode oxidation voltage and the acid electrolyte bath temperature in anodizing, a porous anodized alumina film with a higher quality in pore size and pore array can be obtained.

(5) In addition, an alumina film having through holes as pores with satisfactory roundness and uniform pore size can be obtained. Therefore, the functions of porous materials represented by various filters can be improved, and the applicability of these materials can be enhanced.

BEST MODE OF CARRYING OUT THE INVENTION

First Embodiment

Figure 1:
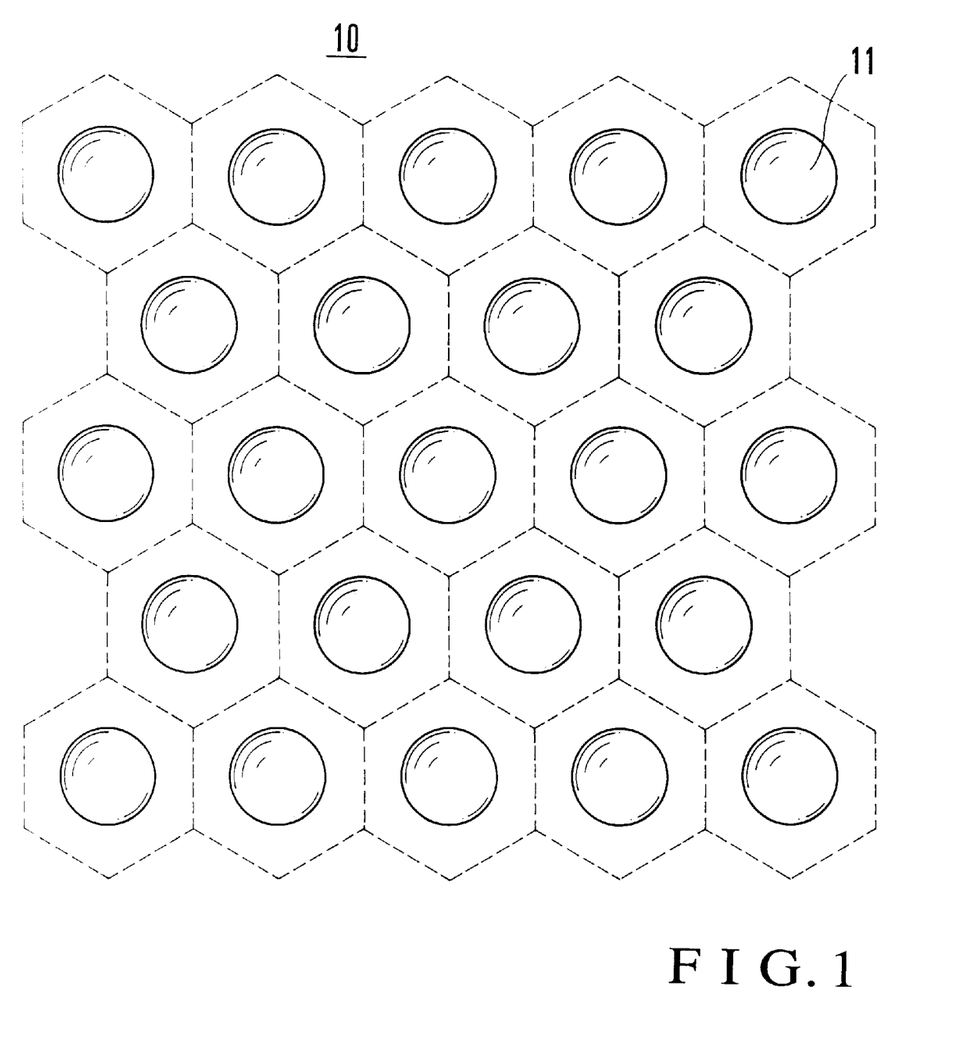
FIG. 1 is a plan view of an aluminum plate having recesses arrayed in a regular hexagon, which is used in the first embodiment of a method of the present invention.

FIG. 1 is a plan view of an aluminum plate used in the first embodiment.

A plurality of fine recesses 11 are formed in the surface of an aluminum plate 10 in advance. These recesses 11 have an interval and array corresponding to those of pores to be formed by anodizing. In this embodiment, to maximize the regularity of pores to be formed by anodizing, recesses around each recess are arrayed in a regular hexagon.

As the aluminum plate, an aluminum plate with high purity is used. The purity is preferably 99.99% or more.

The surface of the aluminum plate 10 is polished to a mirror surface by an appropriate method, thereby smoothing the aluminum plate surface before formation of the recesses 11. More specifically, electropolishing can be performed using the aluminum plate 10 as an anode in an appropriate electrolyte. As an example of such electropolishing, a bath prepared by mixing perchloric acid and ethanol at a ratio of 1:4 is used as the electrolyte, the aluminum plate 10 is used as the anode, and electropolishing is performed for about 4 min, thereby obtaining the aluminum plate 10 having a mirror surface.

In this embodiment, the plurality of recesses 11 arrayed at an equal interval as shown in FIG. 1 are formed in the aluminum plate 10 by etching. This process will be described next with reference to the sectional views shown in FIG. 2.

Figure 2A:
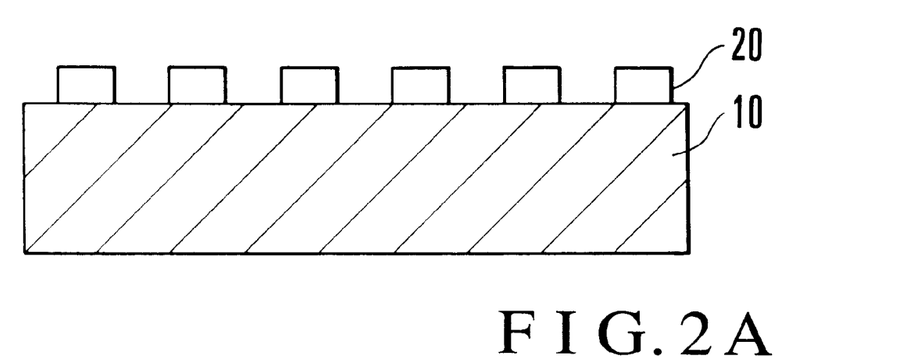
FIGS. 2a–2c show views for explaining the procedure of forming recesses in the aluminum plate surface in the first embodiment.

First, a resist pattern 20 corresponding to pores to be formed by anodizing is formed on the aluminum plate 10 having the mirror surface obtained by the above-described method, by photolithography or electron beam lithography (FIG. 2(a)).

Figure 2B:
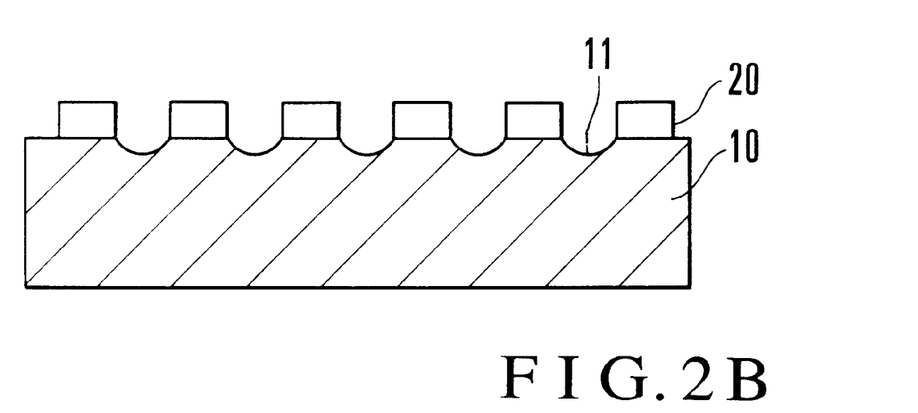

Next, etching is performed using a saturated methanol solution of Br2 to form the recesses 11 corresponding to the resist pattern 20 on the surface of the aluminum plate 10 (FIG. 2(b)). Not only the above-described wet etching but also dry etching using an Ar plasma may be performed.

Figure 2C:
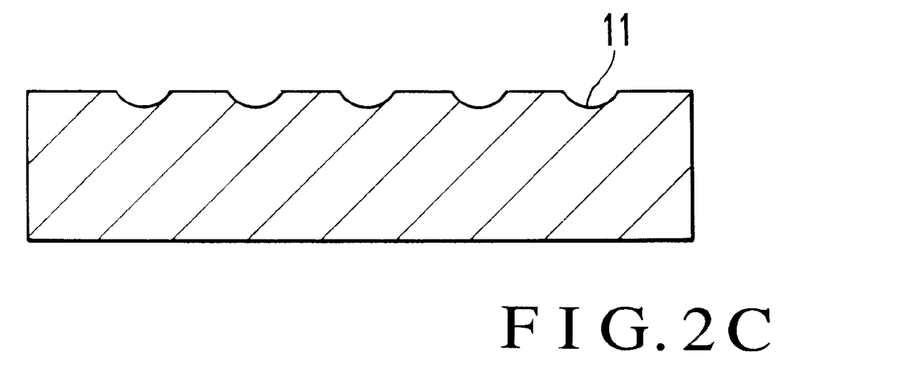

When the resist pattern 20 is removed, the aluminum plate 10 having, in its surface, the recesses 11 corresponding to pores to be formed by anodizing is obtained (FIG. 2(c)).

After the recesses 11 are formed in the surface of the aluminum plate 10, the aluminum plate 10 is anodized in an acid electrolyte, thereby forming a porous anodized alumina film. The process is as follows.

Figure 3A:
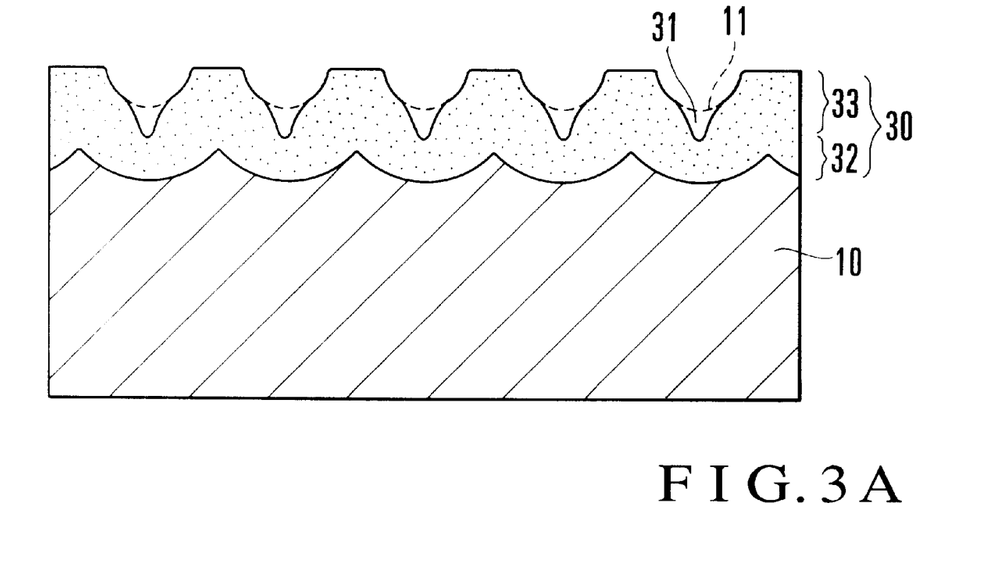
FIGS. 3a–3b show views for explaining formation of a porous anodized alumina film by anodizing in the first embodiment.

When the aluminum plate 10 having the fine recesses 11 as shown in FIGS. 1 and 2(c) is anodized in an acid electrolyte such as oxalic acid, an anodized alumina film 30 is formed on the surface of the aluminum plate 10, as shown in FIG. 3(a). This alumina film 30 is constituted by a thin dielectric barrier layer 32 having no pores and formed in contact with the underlying aluminum plate, and a porous layer 33 contacting the barrier layer 32 and having a pore 31 at the center of each recess. At this time, the pores 31 are formed at the portions of the recesses 11 formed in advance.

Figure 3B:
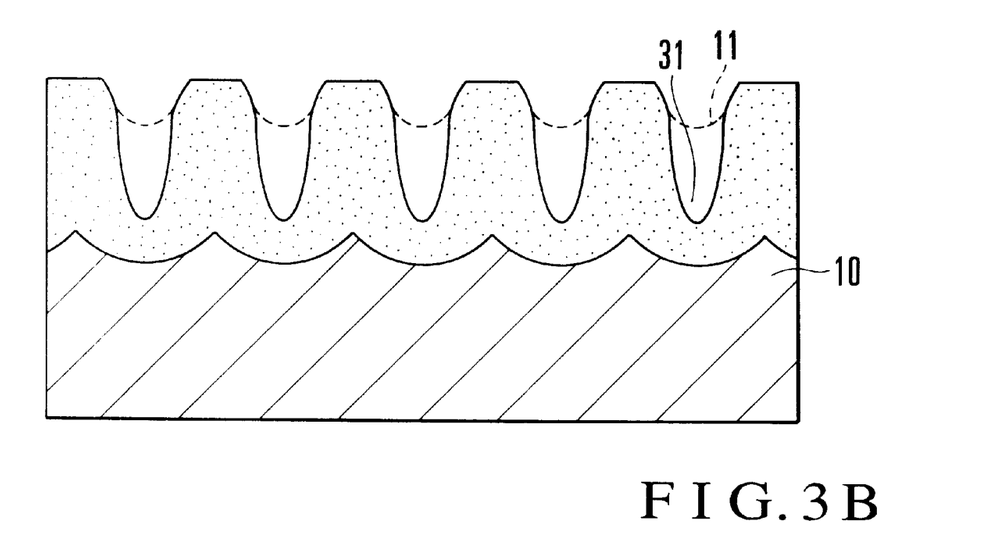

When anodizing is continued, the porous layer 33 of the anodized alumina film 30 becomes thick, as shown in FIG. 3(b), and accordingly, the pores 31 of the porous anodized alumina film becomes deep. As a result, independent pores having good perpendicularity and straightness are formed at positions corresponding to the recesses 11 formed in the surface of the aluminum plate 10.

As the electrolyte usable in the present invention, not only oxalic acid but also another acid electrolyte such as sulfuric acid, a mixed bath of oxalic acid and sulfuric acid, or phosphoric acid can be used as far as it functions as a solvent for an aluminum oxide.

The interval between the pores of the porous anodized alumina film is proportional to the voltage in anodizing, i.e., the anodizing voltage (anode oxidation voltage), and it is known that the proportional constant is about 2.5 nm/V. Therefore, the porous anodized alumina film of the present invention can obtain satisfactory regularity when the recesses 11 are formed to have an interval and array equal to those of the pores to be formed upon anodizing.

As the anodizing condition for improving the regularity of array of pore interval, a voltage range of 35 to 45 V for the oxalic acid bath, a voltage range of 23 to 28 V for the sulfuric acid bath, or an intermediate voltage between the above voltages for the mixed bath of oxalic acid and sulfuric acid can be used obtain a satisfactory result. To form a satisfactory hexagonal close-packed array, the recesses are preferably formed at a pore interval corresponding to the above voltage. Under this condition, a porous anodized alumina film having a pore interval of about 0.1 $\mu$m is obtained.

Figure 4:
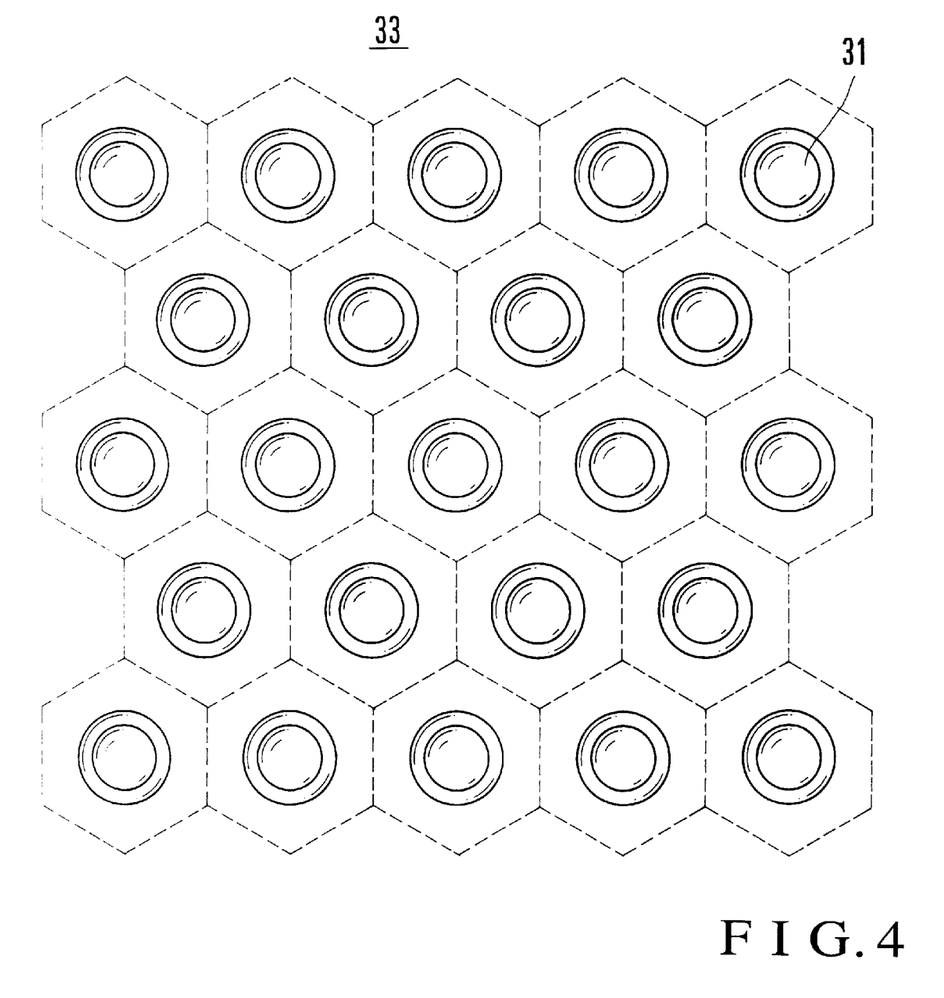
FIG. 4 is a plan view of the anodized alumina film formed in the first embodiment.

FIG. 4 is a plan view of the porous anodized alumina film 30 having pores arrayed at an equal interval and formed by the above method. In this porous anodized alumina film 30, the pores 31 form a satisfactory hexagonal close-packed array in correspondence with the recesses arrayed at an equal interval in a regular hexagon in the aluminum plate 10 in advance.

Second Embodiment

The second embodiment of the present invention will be described next with reference to FIG. 5.

In this embodiment, to form a plurality of recesses on the surface of an aluminum plate, a mask is formed not by photolithography but using polystyrene balls, and etching is performed.

Figure 5A:
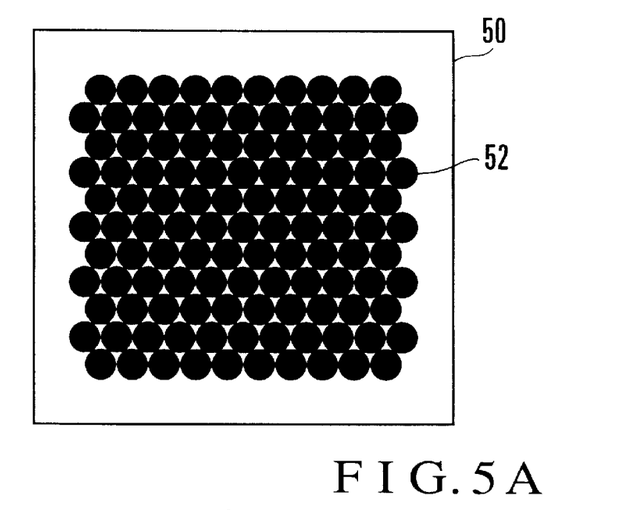
FIGS. 5a–5c show views for explaining the procedure of forming recesses in an aluminum plate surface in the second embodiment of the present invention.
Figure 5B:
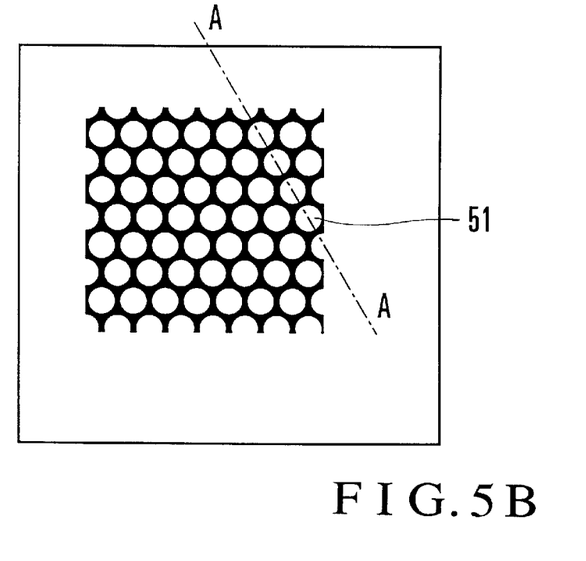

As in the above-described first embodiment, a surface of an aluminum plate 50 to be anodized is mirror-polished, as in the above-described first embodiment, and polystyrene balls 52 are two-dimensionally packed on the surface of the aluminum plate 50 to form a film in a tight contact state (FIG. 5(a)).

While using the polystyrene balls 52 in the tight contact state as a mask, e.g., $SiO_2$ is excessively deposited under an appropriate pressure. $SiO_2$ surrounds the balls to form an $SiO_2$ mask having openings corresponding to the polystyrene balls 52 on the surface of the aluminum plate 50 (FIG. 5(b)).

Figure 5C:
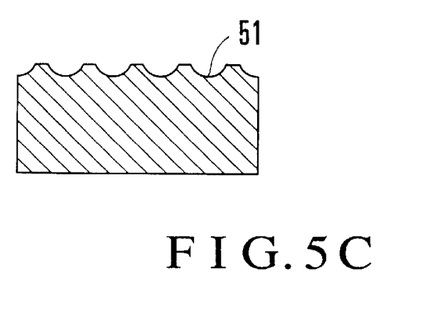

When the aluminum plate 50 is etched using the resultant $SiO_2$ film as a mask, a surface structure having periodical recesses 51 is obtained, as shown in FIG. 5(c). FIG. 5(c) is a sectional view taken along A—A in FIG. 5(b).

After the recesses are formed, the aluminum plate 50 is anodized by the method described in the first Embodiment. With this process, the same result as in the first embodiment shown in FIG. 2 is obtained.

In this embodiment, the diameter of the polystyrene ball 52 can be changed from 50 nm to several $\mu$m. By changing the diameter, the period of the recesses 51 is changed, so the pore interval can also be changed.

In this embodiment, to form the mask, a silicon oxide film ($SiO_2$) is deposited. However, a nitride film may be deposited.

In addition, to form the recesses 51, dry etching or wet etching can be used.

Third Embodiment

The pore interval of the porous anodized alumina film obtained in the above-described first embodiment is as small as about 0.1 μm. To artificially and regularly form such fine recesses in the aluminum plate surface, a high-resolution micropatterning technique is required. When electron beam lithography or X-ray lithography is used, the microfine recesses 11 can be formed in the aluminum plate 10 (FIG. 1). However, it is not economical to apply such an advanced fabrication technique every time porous anodized alumina is formed, which may impose limitations on the application purpose of the porous anodized alumina film of the present invention.

As a characteristic feature of the porous anodized alumina film forming method according to the third embodiment, a plurality of recesses are formed in an aluninum plate surface by pressing a substrate with a plurality of projections on its surface against the aluminum plate surface, i.e., transferring a mother pattern onto the aluminum plate by molding.

This embodiment will be described below with reference to FIG. 6.

Figure 6A:
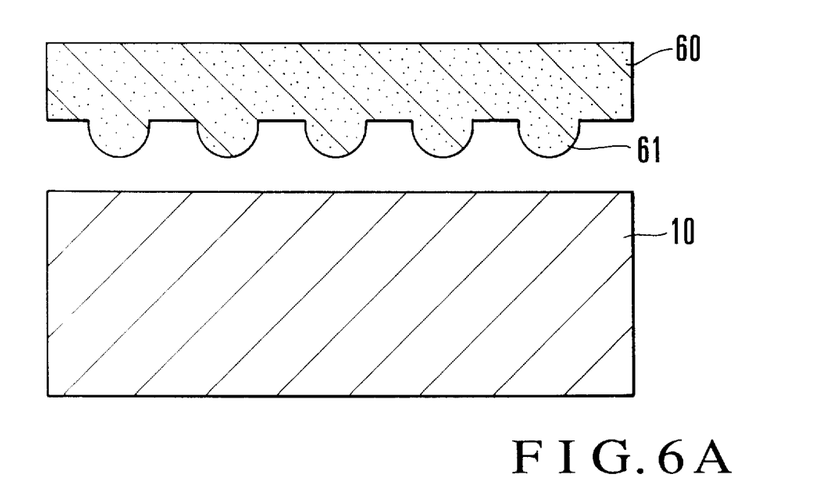
FIGS. 6a–6c show sectional views for explaining the procedure of forming recesses in an aluminum plate surface by texturing based on press patterning in the third embodiment of the present invention.
Figure 6B:
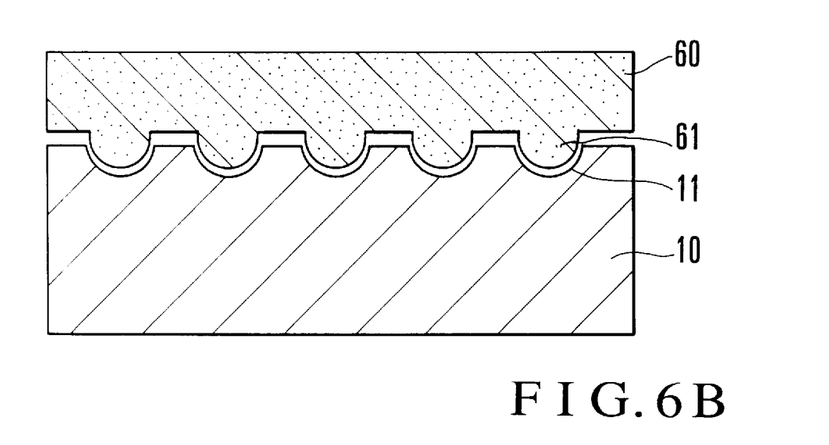
Figure 6C:
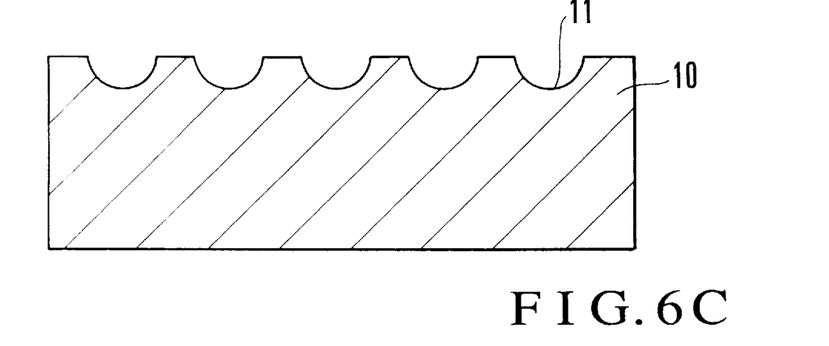

FIG. 6 shows views for explaining the procedure of forming recesses 11 on a surface of an aluminum plate 10 using a substrate 60 having projections (projecting portions) 61 regularly formed.

As shown in FIG. 6(a), the substrate having the projections 61 on the lower surface is prepared. These projections 61 are regularly arrayed in correspondence with recesses to be formed in the aluminum plate 10. The substrate 60 and the projections 61 are preferably formed from a material having a strength and hardness enough not to destroy the projections or change the projection arrangement due to the pressure. For this purpose, a general-purpose silicon substrate easy to micropattern can be used. However, since the substrate is to be repeatedly used, a substrate consisting of diamond or silicon carbide having a high strength is more preferable.

The substrate 60 on which the projections 61 are to be formed must have a mirror surface. The projections 61 are formed on the substrate 60 in correspondence with the recesses by high-resolution lithography.

The shape of each projection 61 is not limited to the semi-spherical shape. The projection 61 may have a conical shape or a pyramidal shape such as a triargular pyramidal shape or quadrangular pyramidal shape, as a matter of course.

The substrate 60 having the projections 61 regularly arrayed as described above is pressed against the surface of the aluminum plate 10, thereby forming fine recesses (recessed portions) 61 in the surface of the aluminum plate 10 (FIG. 6(b)). This process will be referred to as texturing by press patterning hereinafter.

In texturing by press patterning, the method of pressing the substrate 60 with the projections 61 against the aluminum plate 10 can be practiced by bringing the substrate 60 with the projections 61 in tight contact with the aluminum plate 10 and applying a pressure to the substrate 60 using a hydraulic press or the like. In order to further facilitate formation of recesses, the aluminum plate is effectively heated at 200° C. to 500° C. for about 2 hrs in advance and then annealed.

By transferring the mother pattern onto the surface of the aluminum plate 10 in the above-described manner, a plurality of recesses are regularly formed on the surface of the aluminum plate 10 at a predetermined interval (FIG. 6(c)).

When the aluminum plate 10 having the plurality of recesses 11 formed by the above method is anodized in the procedure described in the first embodiment, pores are formed from the recesses 11, so a porous anodized alumina film having pores arrayed at a predetermined interval can be formed.

In the porous anodized alumina film forming method of this embodiment, one substrate having projections is formed and repeatedly used, thereby forming a regular recess array over a large area of a number of aluminum plates. Therefore, an aluminum plate having predetermined recesses can be efficiently and inexpensively mass-produced.

Fourth Embodiment

The present invention will be described next in more detail using a more specific example.

A positive electron beam resist (ZEP-520: tradename of Nippon Zeon Co., Ltd.) was applied to a silicon substrate to a thickness of 0.1 μm by spin coating. A dot pattern in which projections around each projection were arrayed in a regular hexagon at a period of 0.1 μm was exposed by an electron beam exposure apparatus and developed to form about 25-nm diameter pores in the resist. Chromium was deposited on the resultant structure to a thickness of 50 nm using an electron beam deposition apparatus. The structure was dipped in diglime as a solvent. An ultrasonic wave was applied to remove both chromium and the resist so that about 25-nm diameter and 50-nm high projections of chromium were formed. Using the chromium projections as a mask, the silicon substrate was etched to a depth of 60 nm by reactive dry etching using $CF_4$ gas. After this, chromium was removed by an oxygen plasma, thereby forming a substrate on which about 25-nm diameter and 60-nm high projections were regularly arrayed at a period of 0.1 μm.

An aluminum plate having a purity of 99.99% was subjected to electropolishing in a mixed bath containing perchloric acid and ethanol at a ratio of 1:4 for about 4 min to obtain an aluminum plate having a mirror surface. The silicon substrate having the projections was placed on the aluminum plate, and a pressure of 3 ton/cm² was applied using a hydraulic press, thereby forming recesses in the aluminum plate surface.

After this, the aluminum plate having the recesses was subjected to constant-voltage anodizing in oxalic acid having a concentration of 0.3 M (molar) at 17° C. and 40 V.

With this process, a porous anodized alumina film in which the pore interval was 100 nm, and pores around each pore were arrayed in a regular hexagon at an equal interval was obtained. Since the pores had an ideal regular array, each pore had a round shape, and the uniformity of pores was also improved.

Fifth Embodiment

About 20-nm diameter and 60-nm high projections were regularly formed at a period of 63 nm on a silicon carbide substrate in the same process as in the first embodiment.

The silicon carbide substrate having projections was brought into tight contact with an aluminum plate having a purity of 99.99% and polished as in the first embodiment, and a pressure of 3.5 ton/cm² was applied using a hydraulic press, thereby forming recesses in the aluminum plate surface.

After this, constant-voltage anodizing was performed in sulfuric acid having a concentration of 0.5 M at 10° C. and 25 V. With this process, a porous anodized alumina film in which the pore interval was 63 nm, and pores around each pore were arrayed in a regular hexagon at an equal interval was obtained. Since the pores had an ideal regular array, each pore had a round shape, and the uniformity of pores was also improved.

Sixth Embodiment

An electron beam negative resist (SNR-M5: tradename of Tosoh Corporation) was applied to a silicon carbide substrate on which a thin diamond film was deposited to a thickness of 0.5 μm, to a thickness of 0.1 μm. by spin coating. Electron beam exposure was performed to regularly form about 25-nm diameter and 70-nm high projections at a period of 75 nm.

The silicon carbide substrate having the projections was brought into tight contact with an aluminum plate having a purity of 99.99% and polished by the same operation as in the first embodiment. A pressure of 4 ton/cm$^2$ was applied using a hydraulic press to form recesses in the aluminum plate surface.

After this, constant-voltage anodizing was performed in a mixed bath containing oxalic acid having a concentration of 0.3 M and sulfuric acid having a concentration of 0.3 M at a ratio of 3:2 at 5° C. and 30 V.

With this process, a porous anodized alumina film in which the pore interval was 75 nm, and pores around each pore were arrayed in a regular hexagon at an equal interval was obtained. Since the pores had an ideal regular array, each pore had a round shape, and the uniformity of pores was also improved.

Seventh Embodiment

Figure 7A:
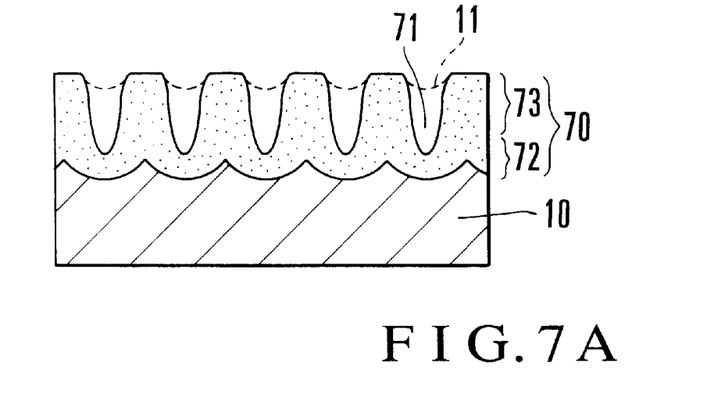
FIGS. 7a–7c show sectional views for explaining the procedure of forming a through hole membrane from a porous anodized alumina film in the fourth embodiment of the present invention.
Figure 7B:
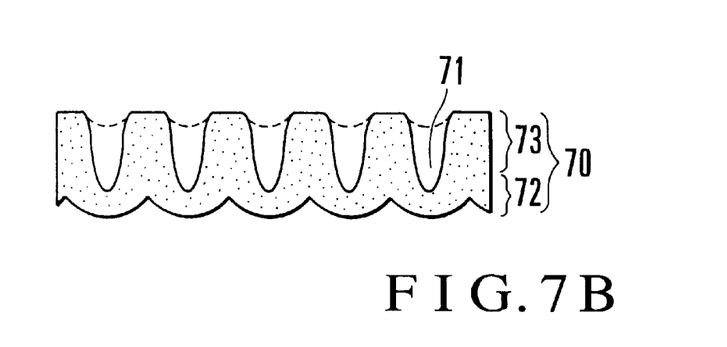

The seventh embodiment of the present invention will be described next with reference to FIG. 7.

In this embodiment, the pores of a porous anodized alumina film formed on an aluminum plate by the third embodiment are formed as through holes to obtain a through hole membrane.

In this embodiment, first, texturing by press patterning is performed for a planished aluminum plate 10 using a substrate (not shown in FIG. 7) having, on its surface, a plurality of projections arrayed at a predetermined interval, as described in the third embodiment of the present invention. A plurality of recesses 11 are formed in the surface of the aluminum plate 10, and the aluminum plate 10 is anodized to manufacture a porous anodized alumina film 70 having pores 71 as shown in FIG. 7(a).

The resultant porous anodized alumina film 70 is constituted by a thin dielectric barrier layer 72 having no pores and formed in contact with the underlying aluminum plate, and a hexagonal columnar porous layer 73 contacting the barrier layer 72 and having a pore 31 at the center of each recess.

To obtain the porous anodized alumina film having through holes, the aluminum plate 10 and the barrier layer 72 (layer having no pores) must be removed.

To remove the aluminum plate 10, aluminum may be dissolved and removed. In this embodiment, the aluminum plate is selectively etched to remove aluminum (FIG. 7(b)). As an etchant, a saturated solution of corrosive sublimate (HgC12) or a saturated methanol solution of Br2 can be used.

Figure 7C:
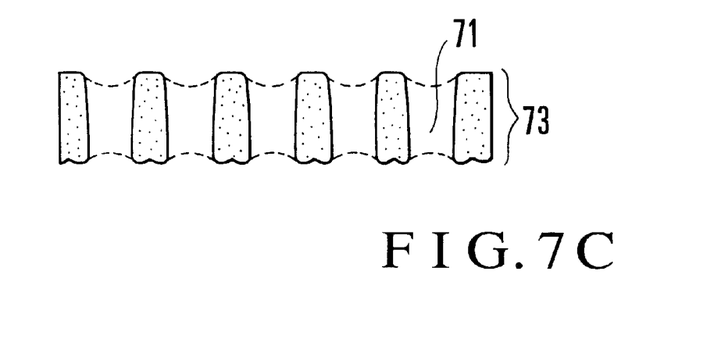

Next, the barrier layer 72 is removed using phosphoric acid or the like, thereby obtaining a through hole membrane (FIG. 7(c)).

In the through hole membrane obtained in the above manner, pores having a satisfactory straightness and uniform diameters are regularly arrayed at a predetermined interval on the nanometer order.

This through hole membrane can be used not only as a filter but also as a starting structure to be used to manufacture a regular structure of a metal or semiconductor.

When the peripheral portion of the aluminum plate is etched into a frame shape, a supporting portion for the through hole membrane can be obtained.

The porous anodized alumina film forming method according to the present invention can be applied not only to an aluminum plate but also to a thin aluminum film formed on an underlying material other than aluminum. This will be described as the fifth embodiment of the present invention with reference to FIG. 8 using, as an example, an aluminum film formed on a silicon substrate.

Figure 8A:
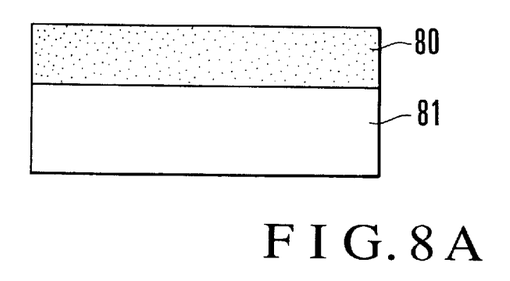
FIGS. 8a–8d show sectional views for explaining the procedure of forming a porous anodized alumina film on an aluminum film in the fifth embodiment of the present invention.

An aluminum film 80 is formed on a silicon substrate 81 by vacuum deposition or sputtering (FIG. 8(a)). To form the aluminum film 80, electrodeposition using precipitation from a solution may be used.

The surface of the silicon substrate 81 as the underlying material for the aluminum film 80 must have smoothness on the nanometer order.

Figure 8B:
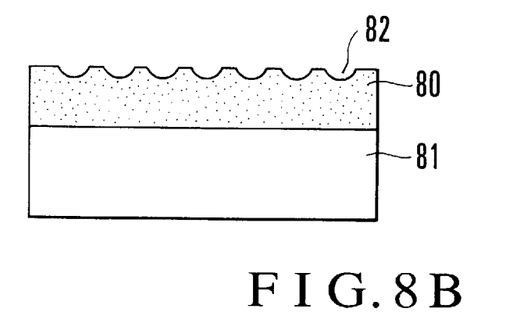
Figure 8C:
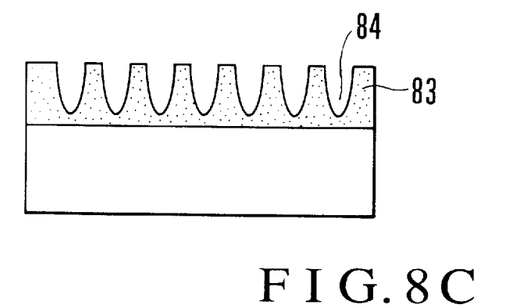

By texturing based on press patterning, a plurality of recesses 82 are arrayed in the surface of the aluminum film 80 at a predetermined interval (FIG. 8(b)). To anodize the aluminum film, a porous anodized alumina film 83 in which pores 84 are formed at positions corresponding to the recesses in the surface of the aluminum film 80 is obtained (FIG. 8(c)).

Figure 8D:
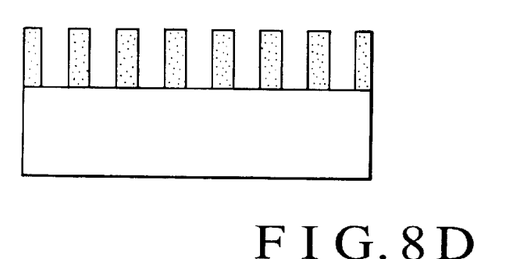

When the barrier layer of the porous anodized alumina film 83 is etched using phosphoric acid or the like, the pores can be formed as through holes extending to the silicon substrate 81 as the underlying material (FIG. 8(d)). To avoid corrosion to the underlying material, selective etching is used.

What is claimed is:

1. A method of forming a porous anodized alumina film, characterized by comprising the steps of:

forming a plurality of recesses in a surface of a smooth aluminum plate in a predetermined array at a predetermined interval; and anodizing the aluminum plate to form a porous anodized alumina film having pores having a predetermined shape and the same interval and array as those of the plurality of recesses.

2. A method of forming a porous anodized alumina film according to claim 1, characterized in that the plurality of recesses are arrayed such that recesses around each recess are arrayed in a regular hexagon in the aluminum plate, and the step of anodizing the aluminum plate comprises anodizing the aluminum plate at an anode oxidation voltage obtained by dividing the interval of the recesses by 2.5 nm/V, thereby forming a hexagonal close-packed array of the plurality of pores corresponding to the plurality of recesses.

3. A method of forming a porous anodized alumina film according to claim 2, characterized in that the step of anodizing the aluminum plate comprises anodizing the aluminum plate in a bath of oxalic acid at the anode oxidation voltage within a voltage range of 35 to 45 V, thereby forming the hexagonal close-packed array of the plurality of pores corresponding to the plurality of recesses.

4. A method of forming a porous anodized alumina film according to claim 2, characterized in that the step of anodizing the aluminum plate comprises anodizing the aluminum plate in a bath of sulfuric acid at the anode oxidation voltage within a voltage range of 23 to 28 V, thereby forming the hexagonal close-packed array of the plurality of pores corresponding to the plurality of recesses.

5. A method of forming a porous anodized aluminum film according to claim 1, characterized by further comprising the steps of after forming the porous anodized alumina film having the pores having the predetermined shape and the same interval and array as those of the plurality of recesses by anodizing, removing the aluminum plate from the porous anodized alumina film, and removing a barrier layer of the porous anodized alumina film to obtain an alumina film having through holes.

6. A method of forming a porous anodized alumina film according to claim 1, characterized in that the step of forming the recesses in the surface of the aluminum plate comprises pressing a substrate having, on a surface, a plurality of projections corresponding to the plurality of recesses against the surface of the aluminum plate to form the plurality of recesses having the predetermined interval and array.

7. A method of forming a porous anodized alumina film according to claim 6, characterized in that the plurality of recesses are arrayed such that recesses around each recess are arrayed in a regular hexagon in the aluminum plate, and the step of anodizing the aluminum plate comprises anodizing the aluminum plate at an anode oxidation voltage obtained by dividing the interval of the recesses by 2.5 nm/V, thereby forming a hexagonal close-packed array of the plurality of pores corresponding to the plurality of recesses.

8. A method of forming a porous anodized alumina film according to claim 7, characterized in that the step of anodizing the aluminum plate comprises anodizing the aluminum plate in a bath of oxalic acid at the anode oxidation voltage within a voltage range of 35 to 45 V, thereby forming the hexagonal close-packed array of the plurality of pores corresponding to the plurality of recesses.

9. A method of forming a porous anodized alumina film according to claim 7, characterized in that the step of anodizing the aluminum plate comprises anodizing the aluminum plate in a bath of sulfuric acid at the anode oxidation voltage within a voltage range of 23 to 28 V, thereby forming the hexagonal close-packed array of the plurality of pores corresponding to the plurality of recesses.

10. A method of forming a porous anodized alumina film according to claim 6, characterized by further comprising the steps of after forming the porous anodized alumina film having the pores having the predetermined shape and the same interval and array as those of the plurality of recesses by anodizing, removing the aluminum plate from the porous anodized alumina film, and removing a barrier layer of the porous anodized alumina film to obtain an alumina film having through holes.

11. A method of forming a porous anodized alumina film, characterized by comprising the steps of:

forming an aluminum film on a substrate having a smooth surface;

forming a plurality of recesses on a surface of the aluminum film to have a predetermined interval and array; and anodizing the surface of the aluminum film to form a porous anodized alumina film having pores having a predetermined shape and the same interval and array as those of the plurality of recesses.

12. A method of forming a porous anodized alumina film according to claim 11, characterized in that the step of forming the recesses in the surface of the aluminum film comprises pressing a substrate having, on a surface, a plurality of projections corresponding to the plurality of recesses against the surface of the aluminum film to form the plurality of recesses having the predetermined interval and array.

* * * * *